(12) United States Patent
Burd et al.

(10) Patent No.: US 10,466,688 B2
(45) Date of Patent: Nov. 5, 2019

(54) APPARATUS AND METHOD FOR PROVIDING EVENT CONTEXT WITH NOTIFICATIONS RELATED TO INDUSTRIAL PROCESS CONTROL AND AUTOMATION SYSTEM

(71) Applicant: Honeywell International Inc., Morris Plains, NJ (US)

(72) Inventors: Matthew G. Burd, Calgary (CA); Andrew Duca, Phoenix, AZ (US); Paul F. McLaughlin, Ambler, PA (US)

(73) Assignee: Honeywell International Inc., Morris Plains, NJ (US)

( * ) Notice: Subject to any disclaimer, the term of this patent is extended or adjusted under 35 U.S.C. 154(b) by 64 days.

(21) Appl. No.: 14/868,058

(22) Filed: Sep. 28, 2015

(65) Prior Publication Data
US 2016/0335858 A1 Nov. 17, 2016

Related U.S. Application Data

(60) Provisional application No. 62/161,536, filed on May 14, 2015, provisional application No. 62/161,542, (Continued)

(51) Int. Cl.
*B60R 25/24* (2013.01)
*G05B 23/02* (2006.01)

(52) U.S. Cl.
CPC ................. *G05B 23/027* (2013.01)

(58) Field of Classification Search
CPC ................. G05B 23/027; G08B 23/027
See application file for complete search history.

(56) References Cited

U.S. PATENT DOCUMENTS

| | | | |
|---|---|---|---|
| 4,141,006 A * | 2/1979 | Braxton | G08B 19/00 340/505 |
| 6,941,557 B1 | 9/2005 | Jakobson et al. | |

(Continued)

FOREIGN PATENT DOCUMENTS

| | | |
|---|---|---|
| JP | 2013-038601 A | 2/2013 |
| KR | 10-2003-0021537 A | 3/2003 |

(Continued)

OTHER PUBLICATIONS

Notification of Transmittal of the International Search Report and the Written Opinion of the International Searching Authority, or the Declaration dated Aug. 9, 2016 in connection with International Patent Application No. PCT/US2016/029758.

(Continued)

*Primary Examiner* — Joseph H Feild
*Assistant Examiner* — Pameshanand Mahase

(57) ABSTRACT

A method includes transmitting a notification to an end-user device, where the notification identifies an event in an industrial process control and automation system. The method also includes obtaining contextual information associated with the event, where the contextual information includes one or more types of additional information associated with the event. The method further includes transmitting the contextual information to the end-user device. In addition, the method could include receiving a request for the contextual information from the end-user device, where the contextual information is transmitted to the end-user device in response to the request. The contextual information could be obtained from multiple devices or systems automatically in response to the request.

21 Claims, 12 Drawing Sheets

Related U.S. Application Data filed on May 14, 2015, provisional application No. 62/161,548, filed on May 14, 2015, provisional application No. 62/161,558, filed on May 14, 2015, provisional application No. 62/161,622, filed on May 14, 2015, provisional application No. 62/161,644, filed on May 14, 2015, provisional application No. 62/161,657, filed on May 14, 2015.

(56) References Cited

U.S. PATENT DOCUMENTS

| | | | |
|---|---|---|---|
| 7,539,724 B1 | 5/2009 | Callaghan | |
| 8,006,121 B1* | 8/2011 | Samoilova | G06F 11/2294 714/2 |
| 2002/0095269 A1* | 7/2002 | Natalini | H04L 12/2803 702/188 |
| 2007/0297557 A1 | 12/2007 | Kuwatani | |
| 2008/0079559 A1* | 4/2008 | Tambascio | G05B 23/0235 340/506 |
| 2008/0127065 A1* | 5/2008 | Bryant | G05B 19/056 717/109 |
| 2010/0082133 A1 | 4/2010 | Chouinard et al. | |
| 2011/0276165 A1 | 11/2011 | Ko et al. | |
| 2012/0029678 A1 | 2/2012 | McGreevy et al. | |
| 2012/0079282 A1 | 3/2012 | Lowenstein et al. | |
| 2013/0212186 A1 | 8/2013 | Camp et al. | |
| 2014/0047107 A1* | 2/2014 | Maturana | H04L 43/04 709/224 |
| 2014/0121789 A1 | 5/2014 | Brandes et al. | |
| 2014/0344369 A1 | 11/2014 | Goldberg et al. | |
| 2015/0007265 A1 | 1/2015 | Aissi et al. | |
| 2015/0077263 A1* | 3/2015 | Ali | G05B 23/0216 340/679 |
| 2016/0173337 A1* | 6/2016 | Lea | H04L 43/0811 370/254 |

FOREIGN PATENT DOCUMENTS

| | | |
|---|---|---|
| KR | 10-1077591 B1 | 10/2011 |
| KR | 10-2012-0087235 A | 8/2012 |
| KR | 10-2013-0006760 A | 1/2013 |
| KR | 10-2014-0059788 A | 5/2014 |
| KR | 10-2014-0103859 A | 8/2014 |

OTHER PUBLICATIONS

Notification of Transmittal of the International Search Report and the Written Opinion of the International Searching Authority, or the Declaration dated Jul. 28, 2016 in connection with International Patent Application No. PCT/US2016/029953.

Notification of Transmittal of the International Search Report and the Written Opinion of the International Searching Authority, or the Declaration dated Jul. 28, 2016 in connection with International Patent Application No. PCT/US2016/030012.

Notification of Transmittal of the International Search Report and the Written Opinion of the International Searching Authority, or the Declaration dated Jul. 28, 2016 in connection with International Patent Application No. PCT/US2016/030037.

Notification of Transmittal of the International Search Report and the Written Opinion of the International Searching Authority, or the Declaration dated Aug. 9, 2016 in connection with International Patent Application No. PCT/US2016/030377.

Notification of Transmittal of the International Search Report and the Written Opinion of the International Searching Authority, or the Declaration dated Jul. 28, 2016 in connection with International Patent Application No. PCT/US2016/029984.

Product Overview, WIN-911 Software, Jan. 13, 2015, 2 pgs.

Product Overview, WIN-911 Enterprise Edition, Feb. 27, 2014, 2 pgs.

Product Data Sheet, WIN-911 Software, Mobile Edition, Smartphone Data Sheet, Sep. 25, 2015, 2 pgs.

Specter Instruments, WIN-911/Lite, Jan. 2005, 2 pgs.

Product Overview, WIN-911 Version 7, Feb. 11, 2014, 2 pgs.

Specter Instruments, Technical Brief, WEB-911 XTools, Jan. 26, 2009, 1 pg.

Technical Brief, "WIN-911 Version 7.17.00, Changes and Enhancements: General WIN-911: V6.18 to V7.17.00", Sep. 10, 2015, 15 pgs.

User's Manual, "WIN-911 V7.12", Oct. 11, 2011, 582 pgs.

Andrew Duca, "Apparatus and Method for Protecting Propietary Information Over Public Notification Infrastructure", U.S. Appl. No. 14/863,006, filed Sep. 23, 2015.

Matthew G. Burd et al., "Apparatus and Method for Universal Annotation in Industrial Process Control and Automation System", U.S. Appl. No. 14/866,857, filed Sep. 29, 2015.

Andrew Duca et al., "Apparatus and Method for Automated Event Notification Read Receipt to Support Non-Repudiated Auditing or Other Functions in Industrial Process Control and Automation System", U.S. Appl. No. 14/868,168, filed Sep. 28, 2015.

Andrew Duca et al., "Apparatus and Method for Event Detection to Support Mobile Notifications Related to Industrial Process Control and Automation System", U.S. Appl. No. 14/868,905, filed Sep. 29, 2015.

Andrew Duca et al., "Apparatus and Method for Translating Industrial Process Control and Automation System Events Into Mobile Notifications", U.S. Appl. No. 14/869,629, filed Sep. 29, 2015.

Graeme Laycock et al., "Apparatus and Method for Using Configurable Rules Linking Triggers With Actions to Support Notifications Associated With Industrial Process Control and Automation System", U.S. Appl. No. 14/869,890, filed Sep. 29, 2015.

* cited by examiner

FIG. 10A

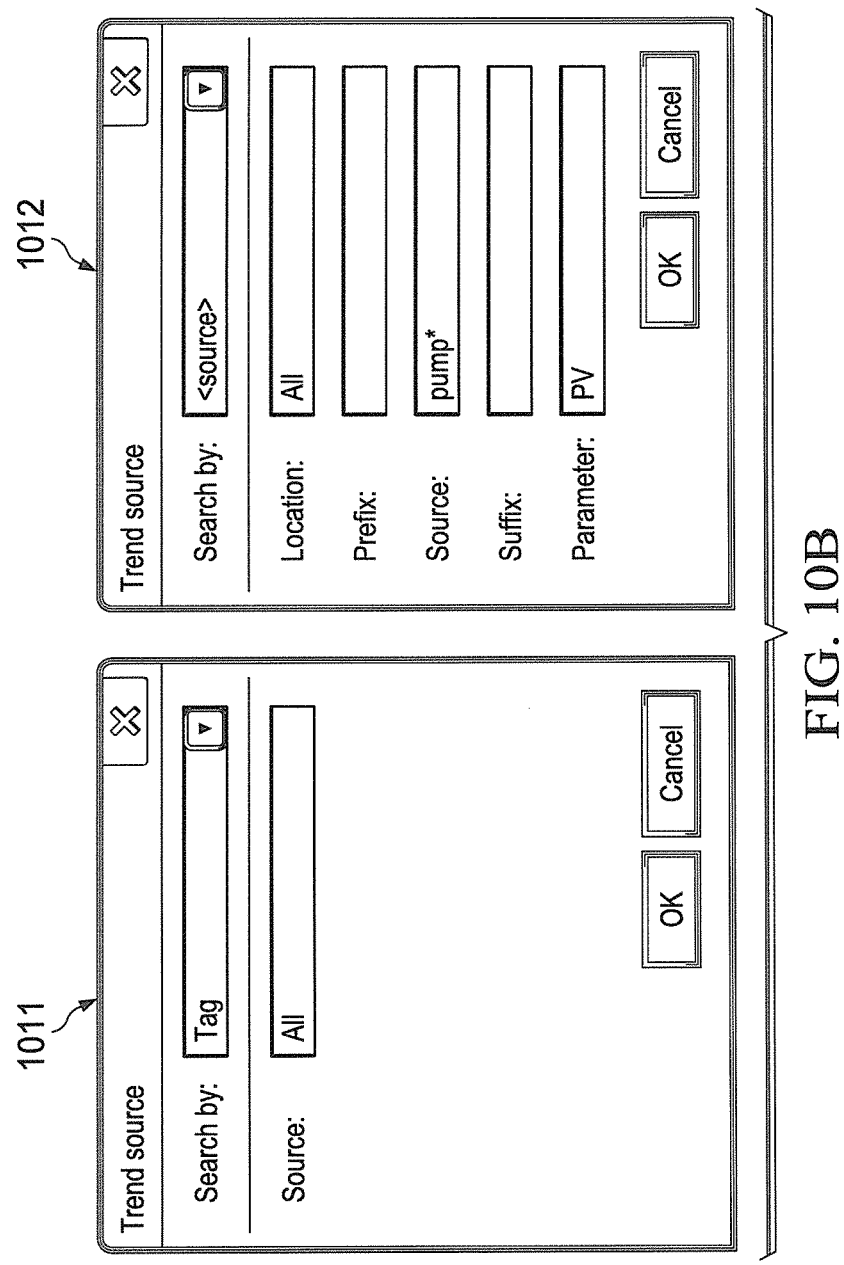

APPLY TO ROLE

Honeywell Mobile

Rules and Roles ▼

Rules | Roles (Engineer)

Roles:
- All Roles
- Engineer
- Manager
- Operator
- Administrator

| | Rule Name | Condition | Actions | Roles |
|---|---|---|---|---|
| ☑ | All critical alarms All assets | Dynamo | Trend Value | All |
| ☑ | Flow rate issues All assets | Dynamo | Trend Value | Engineer |
| ☑ | Heater PV LO Unit 1 | Dynamo | Trend Value | Manager Engineer |
| ☑ | Heater PV HI Unit 8 | Dynamo | Trend Value | Manager Engineer Administrator |
| ☐ | All critical alarms All assets | Dynamo | Trend Value | Manager |
| ☐ | Flow rate issues All assets | Dynamo | Trend Value | Manager |
| ☐ | Heater PV LO Unit 1 | Dynamo | Trend Value | Manager |
| ☐ | Heater PV HI Unit 8 | Dynamo | Trend Value | Manager Administrator |
| ☐ | All critical alarms All assets | Dynamo | Trend Value | None |
| ☐ | Flow rate issues All assets | Dynamo | Trend Value | None |

Apply  Cancel

FIG. 10C

APPARATUS AND METHOD FOR PROVIDING EVENT CONTEXT WITH NOTIFICATIONS RELATED TO INDUSTRIAL PROCESS CONTROL AND AUTOMATION SYSTEM

CROSS-REFERENCE TO RELATED APPLICATIONS AND PRIORITY CLAIM

This application claims priority under 35 U.S.C. § 119(e) to the following U.S. provisional patent applications:

U.S. Provisional Patent Application No. 62/161,536 filed on May 14, 2015 and entitled "APPARATUS AND METHOD FOR TRANSLATING INDUSTRIAL PROCESS CONTROL AND AUTOMATION SYSTEM EVENTS INTO MOBILE NOTIFICATIONS";

U.S. Provisional Patent Application No. 62/161,542 filed on May 14, 2015 and entitled "APPARATUS AND METHOD FOR USING CONFIGURABLE RULES LINKING TRIGGERS WITH ACTIONS TO SUPPORT NOTIFICATIONS ASSOCIATED WITH INDUSTRIAL PROCESS CONTROL AND AUTOMATION SYSTEM";

U.S. Provisional Patent Application No. 62/161,548 filed on May 14, 2015 and entitled "APPARATUS AND METHOD FOR AUTOMATED EVENT NOTIFICATION READ RECEIPT TO SUPPORT NON-REPUDIATED AUDITING IN INDUSTRIAL PROCESS CONTROL AND AUTOMATION SYSTEM";

U.S. Provisional Patent Application No. 62/161,558 filed on May 14, 2015 and entitled "APPARATUS AND METHOD FOR EVENT DETECTION TO SUPPORT MOBILE NOTIFICATIONS RELATED TO INDUSTRIAL PROCESS CONTROL AND AUTOMATION SYSTEM";

U.S. Provisional Patent Application No. 62/161,622 filed on May 14, 2015 and entitled "APPARATUS AND METHOD FOR PROTECTING PROPRIETARY INFORMATION OVER PUBLIC NOTIFICATION INFRASTRUCTURE";

U.S. Provisional Patent Application No. 62/161,644 filed on May 14, 2015 and entitled "APPARATUS AND METHOD FOR PROVIDING EVENT CONTEXT WITH NOTIFICATIONS RELATED TO INDUSTRIAL PROCESS CONTROL AND AUTOMATION SYSTEM"; and U.S. Provisional Patent Application No. 62/161,657 filed on May 14, 2015 and entitled "APPARATUS AND METHOD FOR UNIVERSAL ANNOTATION IN INDUSTRIAL PROCESS CONTROL AND AUTOMATION SYSTEM".

All of these provisional patent applications are hereby incorporated by reference in their entirety.

TECHNICAL FIELD

This disclosure relates generally to industrial process control and automation systems. More specifically, this disclosure relates to an apparatus and method for providing event context with notifications related to an industrial process control and automation system.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications and make adjustments to control or other operations.

SUMMARY

This disclosure provides an apparatus and method for providing event context with notifications related to an industrial process control and automation system.

In a first embodiment, a method includes transmitting a notification to an end-user device, where the notification identifies an event in an industrial process control and automation system. The method also includes obtaining contextual information associated with the event, where the contextual information includes one or more types of additional information associated with the event. The method further includes transmitting the contextual information to the end-user device.

In a second embodiment, an apparatus includes at least one interface configured to communicate with an end-user device. The apparatus also includes at least one processing device configured to initiate transmission of a notification to the end-user device, where the notification identifies an event in an industrial process control and automation system. The at least one processing device is also configured to obtain contextual information associated with the event and initiate transmission of the contextual information to the end-user device, where the contextual information includes one or more types of additional information associated with the event.

In a third embodiment, a non-transitory computer readable medium contains computer readable program code that, when executed, causes at least one processing device to initiate transmission of a notification to an end-user device, where the notification identifies an event in an industrial process control and automation system. The medium also contains computer readable program code that, when executed, causes the at least one processing device to obtain contextual information associated with the event and initiate transmission of the contextual information to the end-user device, where the contextual information includes one or more types of additional information associated with the event.

In a fourth embodiment, a non-transitory computer readable medium contains computer readable program code that, when executed, causes at least one processing device of a mobile device to receive a notification associated with an event in an industrial process control and automation system at the mobile device. The medium also contains computer readable program code that, when executed, causes the at least one processing device to receive contextual information associated with the event at the mobile device and present the contextual information at the mobile device to a user, where the contextual information includes one or more types of additional information associated with the event.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 10A through 10C illustrate an example interface for rule-based definition of notification event context according to this disclosure.

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
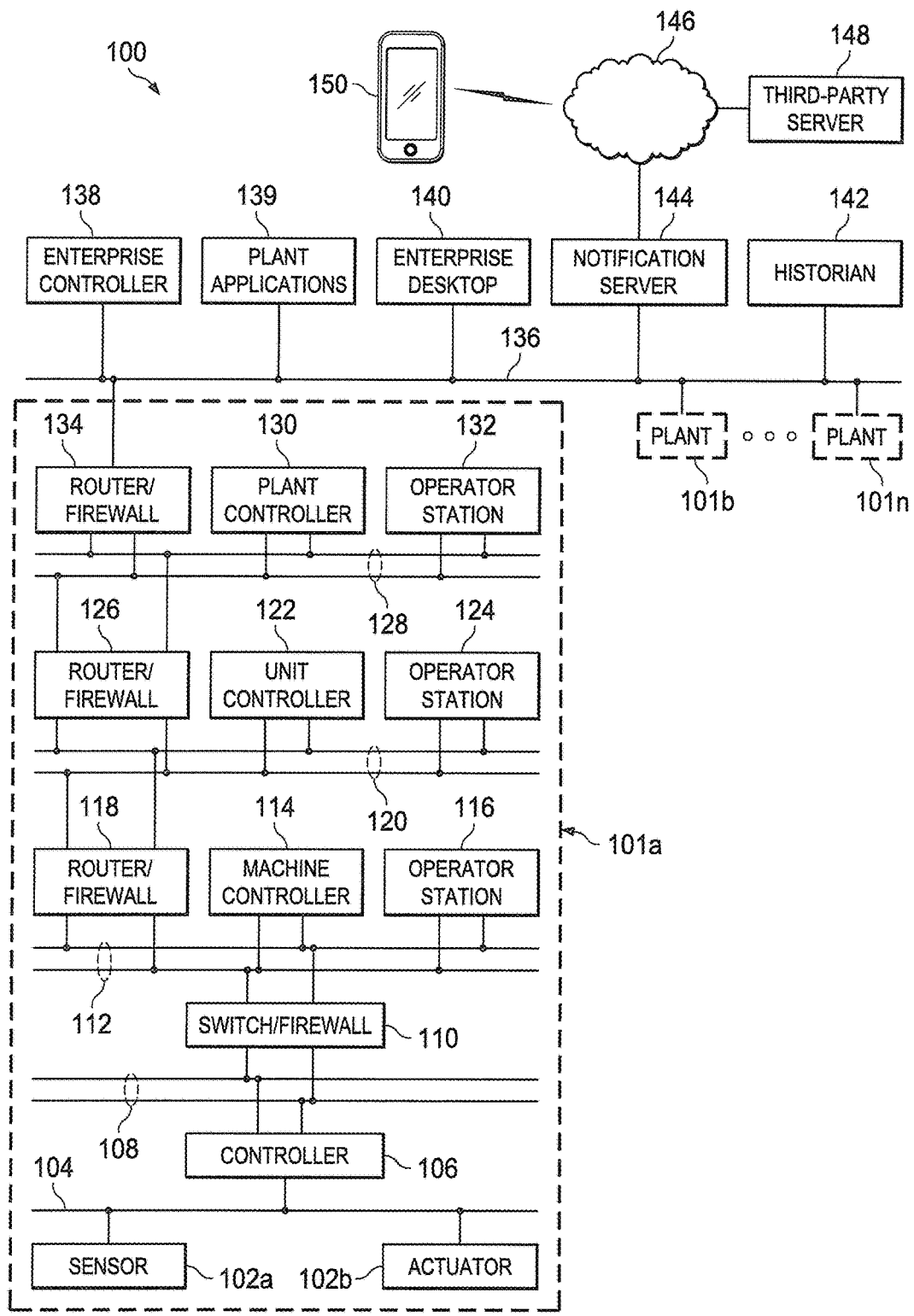
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Various plant applications 139 could also be executed in the system 100. In this example, the plant applications 139 are shown as residing on Level 5 of the system 100, although plant applications 139 could reside on other or additional levels of the system 100. The plant applications 139 could represent any suitable applications that are executed by server computers or other computing devices.

Access to the enterprise-level controllers 138 and plant applications 139 may be provided by one or more enterprise desktops (also referred to as operator stations) 140. Each of the enterprise desktops 140 includes any suitable structure for supporting user access and control of one or more components in the system 100. Each of the enterprise desktops 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 142 can be coupled to the network 136. The historian 142 could represent a component that stores various information about the system 100. The historian 142 could, for instance, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 and each of the operator stations 116, 124, 132, 140 could include one or more processing devices and one or more memories for storing instructions and data used, generated, or collected by the processing device(s). Each of the controllers 106, 114, 122, 130, 138 and each of the operator stations 116, 124, 132, 140 could also include at least one network interface, such as one or more Ethernet interfaces or wireless transceivers, facilitating communication over one or more networks or communication paths.

The widespread use of mobile "smart" devices (such as APPLE IPHONEs and IPADs and ANDROID devices) allows users to remain connected and to interact with remote computing devices from virtually anywhere each user travels. Among other things, this could allow personnel associated with an industrial process control and automation system to receive warnings, alerts, or other notifications associated with events and other information and trigger actions associated with the control and automation system, regardless of whether the personnel are physically located at an industrial site. For example, events that are generated in a process control and automation system are often presented to operators currently on shift in one or more control rooms. There may also typically be a need or desire to inform users outside of control rooms, outside of an industrial plant, or while off network of events that are happening in the control and automation system. These events can come from a variety of applications, such as from a distributed control system (DCS) itself, advanced process control applications, operations applications, or business applications. Delivery of notifications describing these events to a user's handheld mobile device enables the user to receive notifications virtually anywhere and at any time.

To support this functionality, the system 100 includes a notification server 144, which receives data from other component(s) of the system 100 and generates notifications for users. For example, the notification server 144 could receive information identifying different events that occur with the system 100. The events could be associated with any suitable activities or conditions in the system 100, such as the generation of warnings or alerts by other components in the system 100. The notification server 144 could receive this information in any suitable manner and from any suitable source(s), such as from a historian, controller, or plant application. The notification server 144 uses this information to generate notifications (such as push notifications) and other messages to be sent to appropriate users. The notification server 144 could also provide additional information to appropriate users in response to user interactions with those notifications or other messages.

The notification server 144 communicates over a third-party network 146 with a third-party server 148. The third-party network 146 generally represents any suitable communication network(s) outside the system 100 (and therefore out of the control of the owners/operators of the system 100). The third-party network 146 could, for example, represent the Internet, a cellular communication network, or other network or combination of networks. The third-party server 148 represents a server used to provide notifications to end-user devices 150. For example, the third-party server 148 could push notifications to the end-user devices 150, allow retrieval of notifications by the end-user devices 150 at specified intervals or when requested, or provide notifications in any other suitable manner. The end-user devices 150 can then connect to the notification server 144 over the network 146 to receive details about notifications and events or to query for any notifications. As a particular example, the third-party server 148 could be used by companies like APPLE, SAMSUNG, or GOOGLE to provide push notifications or other notifications to mobile devices.

The end-user devices 150 denote any suitable user devices that can receive and present notifications to users. Examples of end-user devices 150 include smartphones, tablet computers, or other communication/computing devices. Specific examples could include APPLE IPHONEs, APPLE IPADs, and ANDROID devices.

Personnel can receive notifications about abnormal events in the system 100 and respond appropriately even if they are away from their normal working environment or away from an industrial facility altogether. The nature and urgency of their responses can depend on a number of factors, such as any or all of the following:

a predefined priority of the event;

whether the situation is stable, improving, or getting worse;

what other abnormal events may be occurring;

whether or not this event is a chronic issue;

whether someone else is already following up on the situation; and whether the event is in his or her power or experience to do anything about.

Various possible responses could also be made by personnel to a notification, such as any or all of the following:

initiating follow-up action by contacting other personnel;

forwarding or escalating the event to other user(s) who are better able to deal with the event;

parking the notification and checking on the situation later;

deleting the notification if it is not relevant; and initiating a work-order or other automated response.

In order to decide how urgent an event is and how to respond, a user often needs additional information to understand the context of the event and assess the current situation. The user also often needs to do this quickly since he or she may be involved in other activities, such as when the user is attending a meeting, at home, at a game or performance, or travelling. When a user is away from his or her normal work environment, the user will routinely have access only to a mobile device.

One current practice in the industry is to automatically send an email to a user when an event of interest occurs. The email typically includes information about the event itself, such as the type of event, when the event occurred, where the event occurred, and what triggered the event (such as value X exceeded limit Y). The user then needs to stop what he or she is doing and either call other plant personnel to find out what is happening (which can be disturbing during a crisis) or log in to the plant's systems via a laptop or other computer to investigate further (which can be time consuming). The user also often needs to perform multiple searches for related information before achieving situational awareness. In some cases, an email notification may include a hyperlink to the plant's systems for direct access, but the user still needs to perform multiple searches, and the systems may not be suitable for access via a mobile smartphone.

In accordance with this disclosure, the notification server 144 or other device(s) in the system 100 help to address the need for fast situational awareness by automatically presenting one or more users with relevant information and context for an event via the end-user device(s) 150. For example, the notification server 144 or other device(s) in the system 100 could provide the following information to a user:

details of an event itself, such as the type of event, when the event occurred, where the event occurred, and what triggered the event;

a trend chart of one or multiple related variables to indicate whether the situation is stable, improving, or getting worse, as well as the state of other variable(s) that may affect or be affected by the event;

a history of the event to indicate if this is a common repeating problem or an infrequent one;

the status of any related event(s) to help the user understand the extent of the problem and identify possible causes and effects; and comments entered by other users.

All of this information can be presented automatically to users in a format optimized for mobile devices, such as in push or other notifications sent to the end-user devices 150. This helps to give the users quick situational awareness. Follow-up actions can be initiated directly from the mobile devices.

In this way, personnel can quickly identify the context associated with an event while using a mobile device. The personnel can then take suitable appropriate action(s) in response to the event right from his or her mobile device. This helps to increase personnel availability and decrease potential response times as issues arise with an industrial facility. It also helps the personnel to make faster and smarter decisions regarding how to respond to issues with an industrial facility.

Although FIG. 1 illustrates one example of an industrial process control and automation system 100, various changes may be made to FIG. 1. For example, a control and automation system could include any number of sensors, actuators, controllers, operator stations, networks, servers, end-user devices, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which event context can be provided with notifications related to an industrial process control and automation system. This functionality can be used in any other suitable system.

Figure 2:
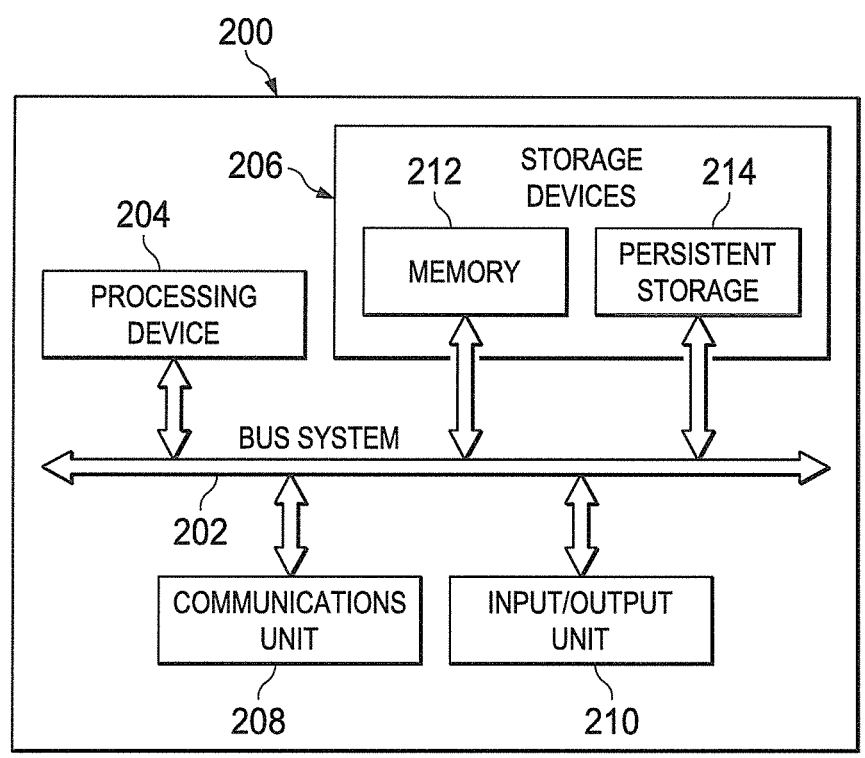
FIG. 2 illustrates an example device for providing event context with a notification related to an industrial process control and automation system according to this disclosure.

FIG. 2 illustrates an example device 200 for providing event context with a notification related to an industrial process control and automation system according to this disclosure. The device 200 could, for example, represent the notification server 144 or the end-user device 150 in the system 100 of FIG. 1. However, the notification server 144 or the end-user device 150 could be implemented using any other suitable device or system, and the device 200 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, or other network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

When implementing the notification server 144, the device 200 could execute instructions used to perform any of the functions associated with the notification server 144. For example, the device 200 could execute instructions that detect the occurrence of various events, such as by detecting warnings or alarms generated in the system 100, and that generate notifications associated with the events. The device 200 could also execute instructions used to process incoming requests for various categories of contextual information related to notifications or events. The device 200 could further execute instructions used to transmit contextual information to the end-user devices 150 or forward the requests to other components that can provide contextual information to the end-user devices 150.

When implementing the end-user device 150, the device 200 could execute instructions used to perform any of the functions associated with the end-user device 150. For example, the device 200 could execute instructions that process notifications and transmit requests for various categories of contextual information related to notifications or events. The device 200 could also execute instructions used to receive and display various categories of contextual information and to identify functions related to the notifications or events that can be invoked by a user. The device 200 could further execute instructions used to transmit commands invoked by a user to the notification server 144 or other components of the system 100.

Although FIG. 2 illustrates one example of a device 200 for providing event context with a notification related to an industrial process control and automation system, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
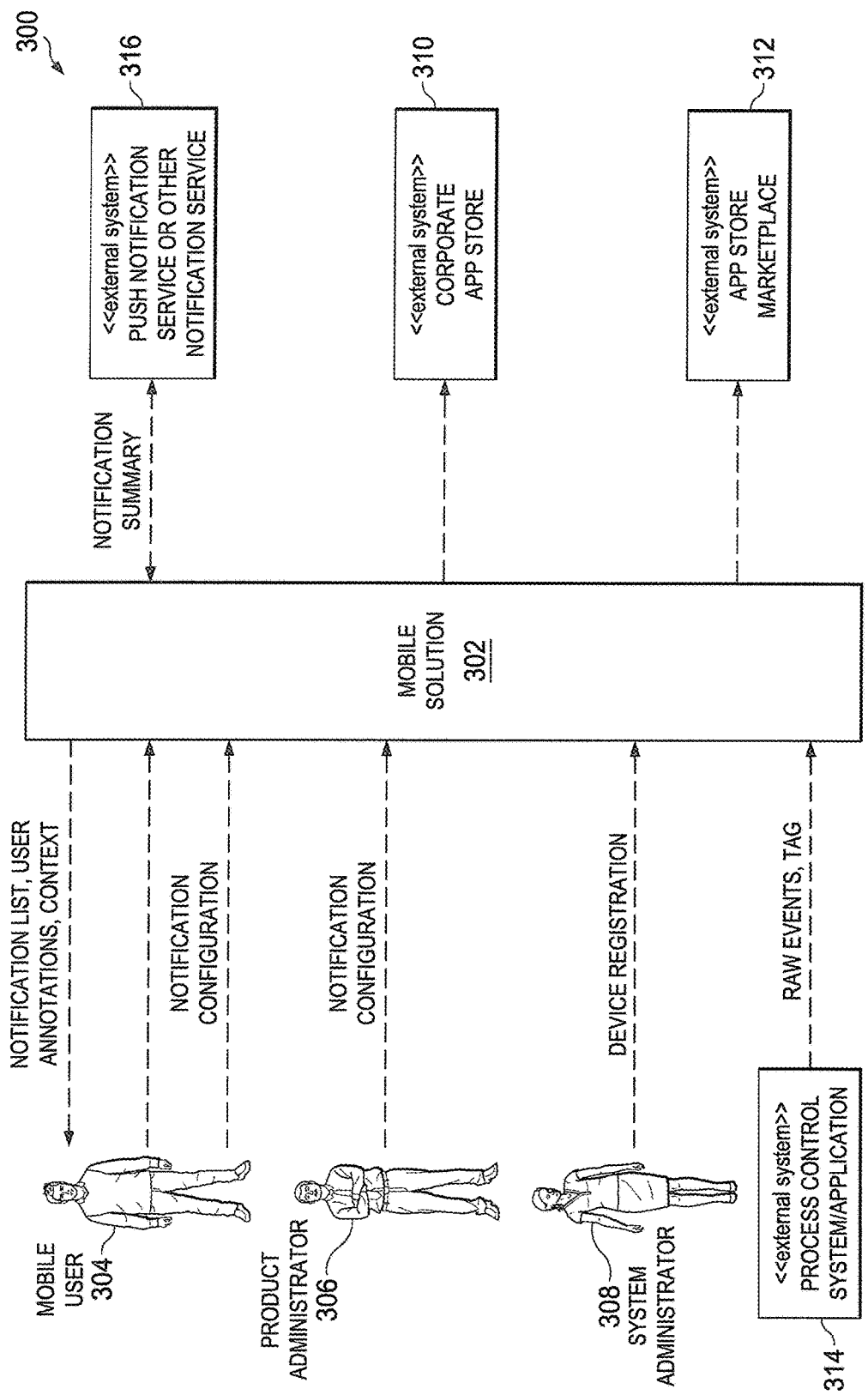
FIG. 3 illustrates an example context model for providing event context with a notification related to an industrial process control and automation system according to this disclosure.

FIG. 3 illustrates an example context model 300 for providing event context with a notification related to an industrial process control and automation system according to this disclosure. For ease of explanation, the context model 300 is described as being supported by the industrial process control and automation system 100 of FIG. 1. However, the context model 300 could be supported by any other suitable system.

As shown in FIG. 3, the context model 300 includes a mobile solution 302, which generally denotes at least part of the functionality of the notification server 144 and the application executed by the end-user devices 150. The mobile solution 302 interacts with three types of users 304-308 in this example, namely mobile users 304, product administrators 306, and system administrators 308. The mobile users 304 generally denote end users who use the end-user devices 150 to receive notifications and optionally act on those notifications. For example, the mobile users 304 could use the end-user devices 150 to review notifications regarding events in the industrial process control and automation system 100 and interact with other users to resolve undesirable or problematic situations in the system 100. Note, however, that the notifications could be used in any other suitable manner. The mobile users 304 could also have the ability to configure or control the notifications that are sent to those mobile users 304, such as by defining different rules used to generate the notifications.

The product administrators 306 represent users who configure the functionality of the mobile solution 302. For example, the product administrators 306 could define rules or other logic that control the generation of the notifications. As a particular example, the product administrators 306 could create rules that define the notifications sent in response to various events, the users who receive those notifications, and the contents of those notifications. In some embodiments, rules can be defined for different roles, and associations of users to those roles can be used to identify the mobile users 304 who receive notifications for those roles. As noted above, end users can also create their own rules for notifications, and the product administrators 306 could have the ability to review, modify, or delete the end user-created rules.

The system administrators 308 represent users who are responsible for allowing the mobile application executed by the end-user devices 150 to be authorized in their environment. For example, the system administrators 308 could grant permissions for end-user devices 150 to access the mobile solution 302 and register the end-user devices 150 with the mobile solution 302.

The application executed by the end-user devices 150 could be provided via an electronic store or marketplace, such as a corporate store 310 or a third-party store 312. Each electronic store 310-312 generally represents a computing system hosting one or more applications or "apps" that can be downloaded to the end-user devices 150. As the names imply, the corporate store 310 denotes a computing system operated by a corporation or other entity associated with the industrial process control and automation system 100 or other system. The third-party store 312 denotes a computing system operated by a third party unrelated to the industrial process control and automation system 100 or other system, such as APPLE or GOOGLE. End users can use their end-user devices 150 to access one or more of the electronic stores 310-312 and download an app that supports the use of notifications with context-based event information.

Once configured and placed into operation, the mobile solution 302 receives information about events from various sources, such as one or more process control systems or applications 314. Each process control system or application 314 could represent any component within the industrial process control and automation system 100 that can generate events or data indicative of events. In some instances, a process control system or application 314 can be designed to specifically integrate with the mobile solution 302, and the process control system or application 314 can itself provide events with or without tags (event-related information) to the mobile solution 302. In other instances, a process control system or application 314 may be unable to provide this information to the mobile solution 302 itself, and a plug-in or other mechanism can be used with the process control system or application 314 to identify events and transmit information to the mobile solution 302.

However the events are detected, the mobile solution 302 receives information about the events and uses rules or other logic to generate notifications for mobile users 304. The mobile solution 302 also sends the notifications to the end-user devices 150 of the mobile users 304. In some embodiments, the notifications are sent to the mobile users 304 directly via a third-party notification service 316, which could denote a service provided by the third-party server 148. The third-party notification service 316 could include an APPLE or ANDROID push notification service, although other push or non-push notification services could be used. The third-party notification service 316 provides the notifications to the end-user devices 150 used by the mobile users 304. Alternatively, the mobile solution 302 can generate obfuscated messages (such as unique alphanumeric codes, brief summaries, or other obfuscations) for the generated notifications, and the obfuscated messages can be sent to the third-party notification service 316 for delivery to the mobile users 304 as obfuscated notifications. The obfuscated notifications can be used by the end-user devices 150 to securely interact with the mobile solution 302 in order to obtain and present non-obfuscated notifications to the mobile users 304.

In whatever manner the notifications are provided to the end-user devices 150, the end-user devices 150 can present the notifications to the mobile users 304. For example, an end-user device 150 can receive and present a listing of notifications for a particular mobile user 304, where the listing identifies the notification messages, their associated identifiers, and some (or possibly all) of the fields of the notification messages. Annotations or other text-based communications associated with those notifications can also be provided to or received from the end-user device 150. Annotations could include communications such as comments from users or read receipts, forwarding indicators, or other system-generated annotations. In addition, context (such as detailed historical data for one or more process variables) can be provided to the end-user device 150. Note, however, that notifications can be used in any other suitable manner and that any other suitable data associated with the notifications can be sent to or received from the end-user devices 150.

Although FIG. 3 illustrates one example of a context model 300 for providing event context with a notification related to an industrial process control and automation system, various changes may be made to FIG. 3. For example, additional types of users could be associated with the mobile solution 302, or functions of multiple user types could be combined. Also, while specific entities such as APPLE and ANDROID are described above, other stores or notification services could be used. In addition, various components could be added, omitted, combined, further subdivided, or placed in any other suitable configuration according to particular needs.

Figure 4:
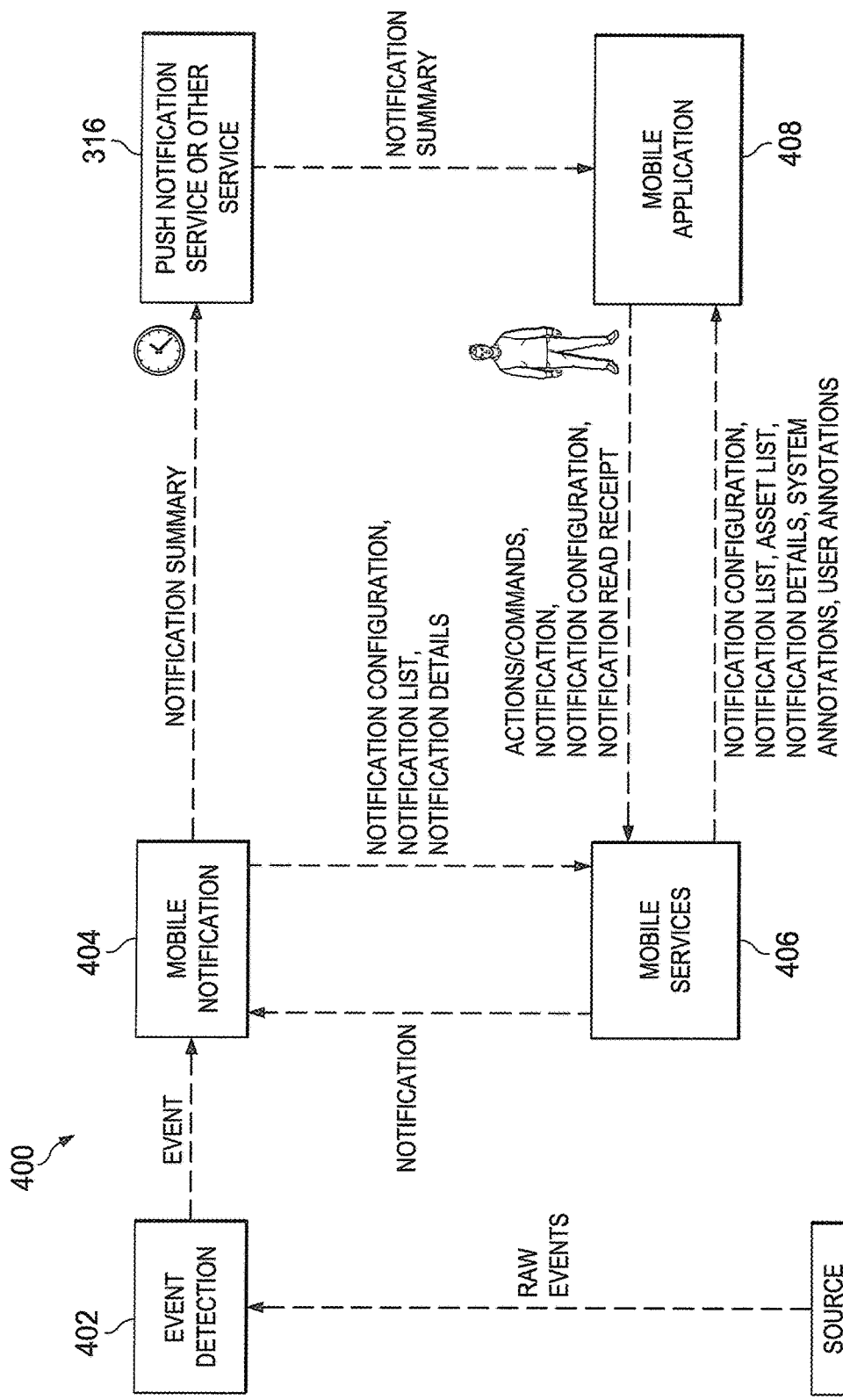
FIG. 4 illustrates an example system model for providing event context with a notification related to an industrial process control and automation system according to this disclosure.

FIG. 4 illustrates an example system model 400 for providing event context with a notification related to an industrial process control and automation system according to this disclosure. For ease of explanation, the system model 400 is described as being supported by the industrial process control and automation system 100 of FIG. 1. However, the system model 400 could be supported by any other suitable system. Also, in the following discussion, it is assumed that obfuscated notifications are sent to the end-user devices 150 via the third-party notification service 316 and that the end-user devices 150 request non-obfuscated notifications securely from the notification server 144. However, other mechanisms for providing notifications to the end-user devices 150 could be used, such as direct delivery of non-obfuscated notifications via the third-party notification service 316.

As shown in FIG. 4, the system model 400 includes an event detection unit 402, a mobile notification unit 404, and a mobile services unit 406. These units 402-406 could, for example, denote different functional units of the mobile solution 302. Each of the units 402-406 could be implemented using any suitable hardware or a combination of hardware and software/firmware instructions. For instance, each of the units 402-406 could be implemented using one or more software routines executed by the processing device(s) 204 of the notification server 144.

The event detection unit 402 receives information associated with events, such as from one or more process control systems or applications 314. The information associated with the events could include information such as a time of an event, a source of the event, a condition associated with the event, a category (such as minor, major, or critical) of the event, and a description of the event. The event detection unit 402 can obtain the information about the events in any suitable manner. For example, the event detection unit 402 could poll the process control systems or applications 314 at specified intervals, in response to triggering events, or at other times. The event detection unit 402 could also receive the information from plug-ins or other data collection components in or associated with the process control systems or applications 314 at specified intervals, in response to triggering events, or at other times. The events here could represent all events generated by the process control systems or applications 314 or only a subset of events generated by the process control systems or applications 314 (such as only certain types of events). The event detection unit 402 processes the information and outputs information identifying the events, such as in a standard format, to the mobile notification unit 404.

The mobile notification unit 404 receives the information identifying the events from the event detection unit 402 and generates obfuscated notifications for end-user devices 150. For example, the mobile notification unit 404 can generate non-obfuscated notifications containing suitable information about the events, generate unique identifiers for the non-obfuscated notifications, and generate obfuscated notifications that include the unique identifiers. The obfuscated notifications (referred to in FIG. 4 as notification summaries) are sent to the third-party notification service 316 for delivery to mobile applications 408. The mobile applications 408 represent an application executed by one or more end-user devices 150. The mobile notification unit 404 also provides various information, such as lists of notifications and the notifications themselves, to the mobile services unit 406.

The mobile services unit 406 interacts with each mobile application 408 securely, such as by using Virtual Private Network (VPN) or other secure communication protocol. The mobile services unit 406 performs various functions related to notifications. For example, the mobile services unit 406 could receive unique identifiers or other obfuscations from the mobile applications 408, retrieve non-obfuscated notifications associated with those obfuscations, and provide the non-obfuscated notifications to the mobile applications 408. The mobile services unit 406 can also manage lists of notifications that particular users have received, manage read-receipts for notifications that are read or viewed on the users' end-user devices 150, and allow rules to be configured by the end-user devices 150. The mobile services unit 406 can further provide user-generated or system-generated annotations to the end-user devices 150 and receive user annotations from end-user devices 150 for delivery to other end-user devices 150. In addition, the mobile services unit 406 can receive invocations of various commands from the end-user devices 150, such as commands for obtaining historical data, user comments, or other contextual information about a specific notification.

The mobile application 408 executed by the end-user devices 150 provides notifications to the mobile users 304. In response to a user selection of a specific notification, the mobile application 408 can request context information associated with the specific notification, such as process variable values or trends. The context information helps the user make more informed decisions about how to respond to the notification.

Although FIG. 4 illustrates one example of a system model 400 for providing event context with a notification related to an industrial process control and automation system, various changes may be made to FIG. 4. For example, various components could be added, omitted, combined, further subdivided, or placed in any other suitable configuration according to particular needs. Also, various components in FIG. 4 (such as components 402-406) could be implemented using a common device, or at least some of those components could be implemented using different devices.

Figure 5:
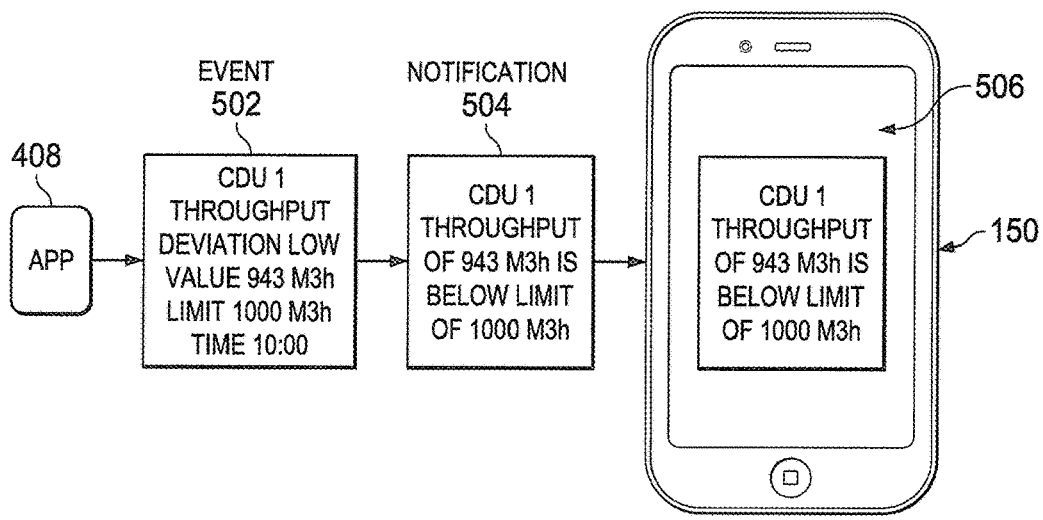
FIGS. 5 and 6 illustrate an example technique for providing event context with a notification related to an industrial process control and automation system according to this disclosure.
Figure 6:
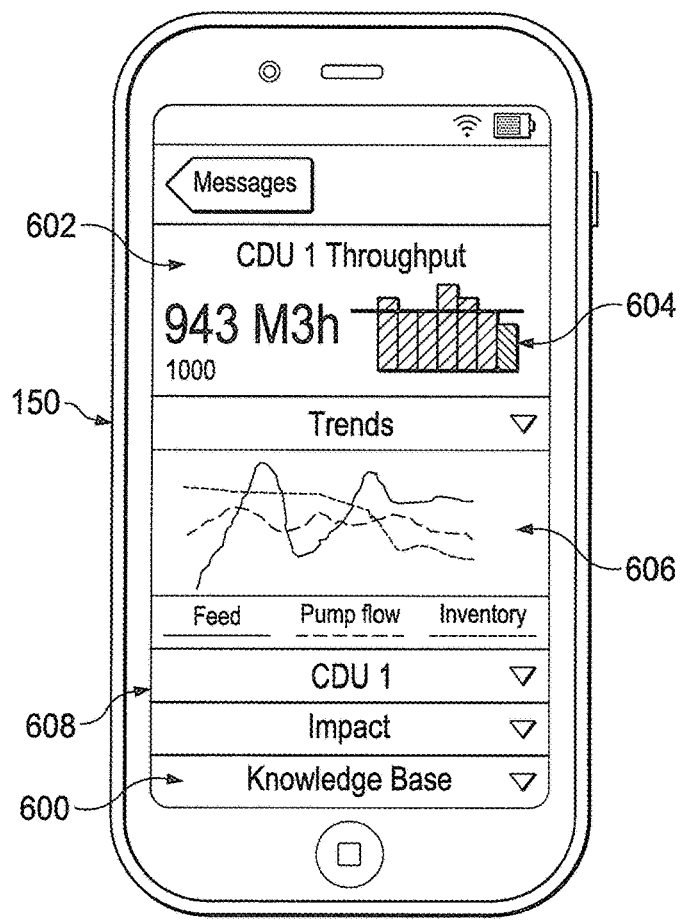

FIGS. 5 and 6 illustrate an example technique for providing event context with a notification related to an industrial process control and automation system according to this disclosure. In this example, the mobile application ("app") 408 is executed by an end-user device 150 to retrieve notifications and other information and to provide user inputs to the control and automation system 100.

As noted above, the notification server 144 or other device(s) in the system 100 help(s) to address the need for fast situational awareness by automatically presenting relevant information and context for an event. Here, an event 502 is identified by the mobile solution 302 and used to generate a notification 504. The notification 504 is transmitted to the end-user device 150 for presentation by the mobile application 408 on a display 506 of the end-user device 150.

If and when a mobile user 304 opens the notification 504 at the end-user device 150, a graphical user interface 600 as shown in FIG. 6 could be presented to the user. In the graphical user interface 600, various categories of information related to an event could be provided. For example, the categories of information can include event details 602, which can identify the name of an event and one or more data values associated with the event. The data values could include historical data 604 for one or more process variables in the process control and automation system 100 related to the event. The categories of information can also include related trend tags 606, which denote trends of one or more process variables in the process control and automation system 100 over time. The categories of information can further include additional sections 608 of information, which can include any suitable items of information. For instance, the additional sections 608 could include an identification of related events, an event history for this specific event (such as whether the same event has occurred before), related comments provided by users, information identifying economic or other impacts of the event, or a knowledge base of information related to the event (such as how the event was resolved previously).

When the mobile application 408 receives a notification, the application 408 asks the notification server 144 to provide information for each of those categories relative to the event associated with that notification. The notification server 144 or other device(s) in the system 100 in turn can determine what is relevant in each of those categories, which could be done in a number of ways. Examples of data that could be relevant include:

data that is part of the event itself, provided by the device or system that initiated the notification (such as the process control system or application 314);

data that has been explicitly configured as relevant to this event;

data that has been explicitly configured as relevant to events of this type;

data that is associated with the event via a data model, such as when the event pertains to a piece of equipment and other operating measurements of the equipment can be assumed to be relevant;

data whose relevance can be suggested by statistical or other techniques; and data that this user or other users have looked at before in relation to this or similar events.

The system 100 returns the related data in each category back to the end-user device 150 for display. Note, however, that the categories of information shown and described here are for illustration only The end-user device 150 also provides various controls that could be invoked by the user. For example, the user could trigger functions to subscribe or unsubscribe to particular information or notifications, collaborate with other users regarding a notification, or raise a work order for dealing with a notification. Other functions could include handing off a notification to or sharing a notification with one or more other users. In addition, the functions could include invoking functions to shelve a notification, indicate that a notification has been resolved, or indicate that a notification is to be ignored. Note, however, that the controls and functions described here are for illustration only.

The formatting of the information provided in the graphical user interface 600 could vary based on the specific information to be displayed, as well as the device on which the graphical user interface 600 is displayed. This may allow, for example, a wide range of mobile devices to be used with the mobile solution 302.

Although FIGS. 5 and 6 illustrate one example of a technique for providing event context with a notification related to an industrial process control and automation system, various changes may be made to FIGS. 5 and 6. For example, the content and arrangement of the information presented on the end-user device 150 are for illustration only.

Figure 7:
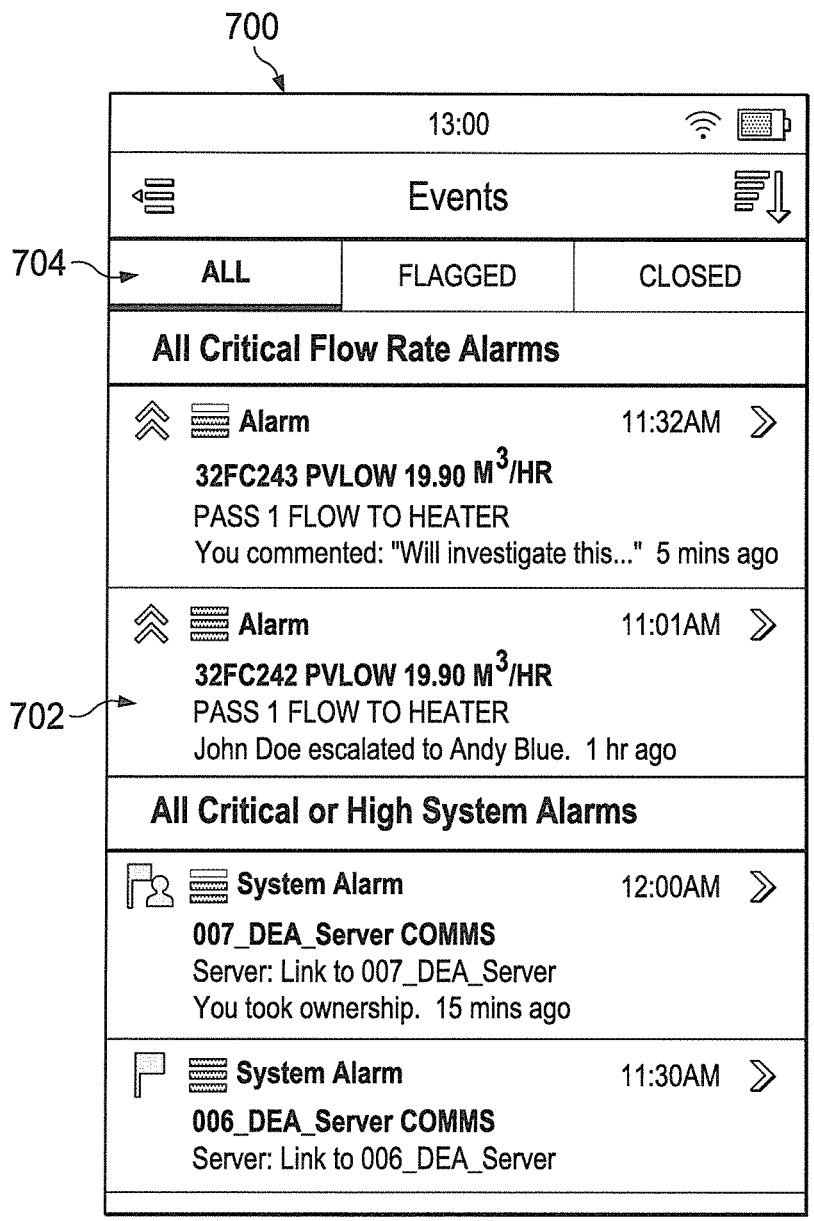
FIGS. 7 through 9 illustrate example notifications related to an industrial process control and automation system according to this disclosure.
Figure 8:
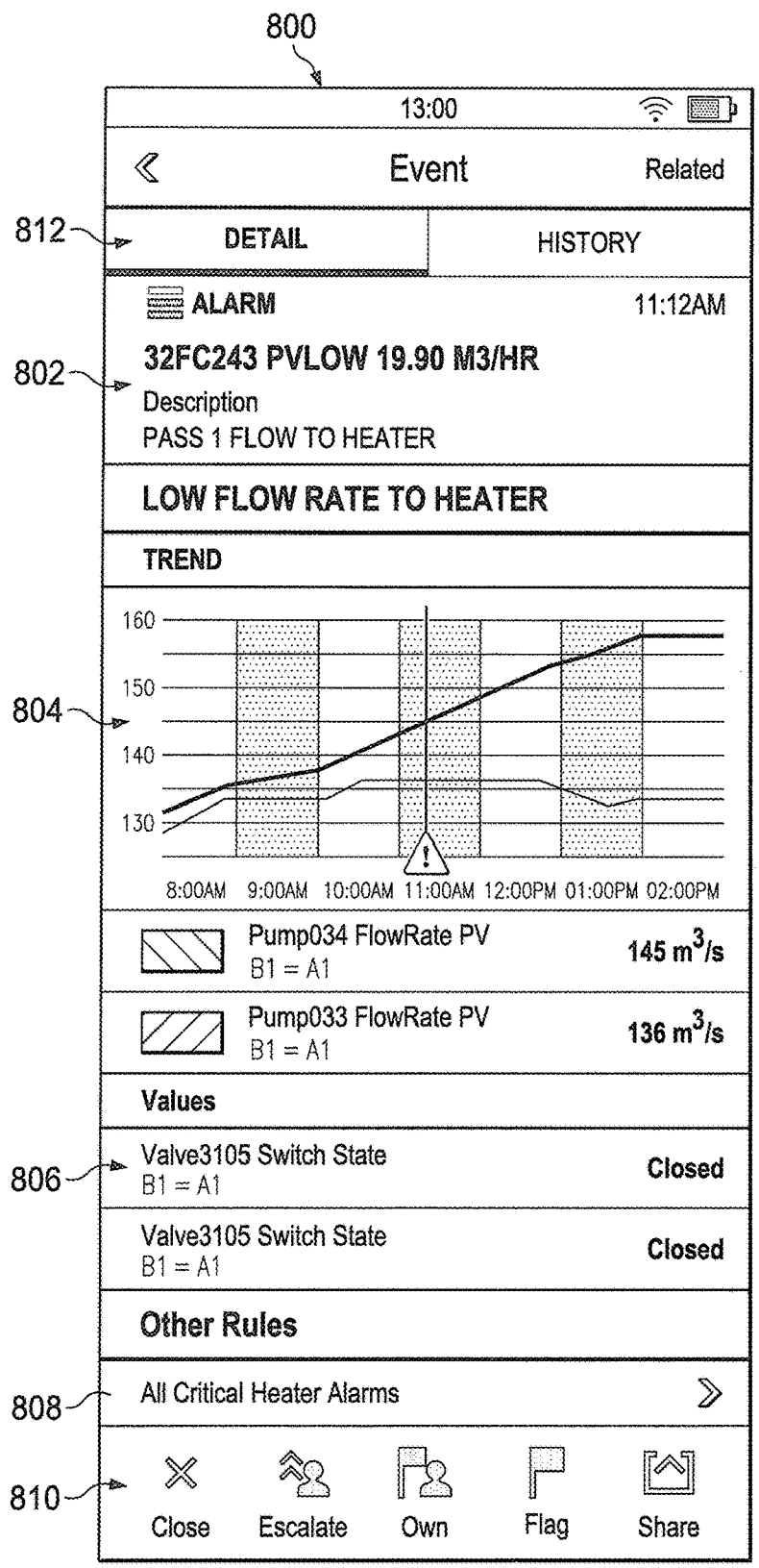
Figure 9:
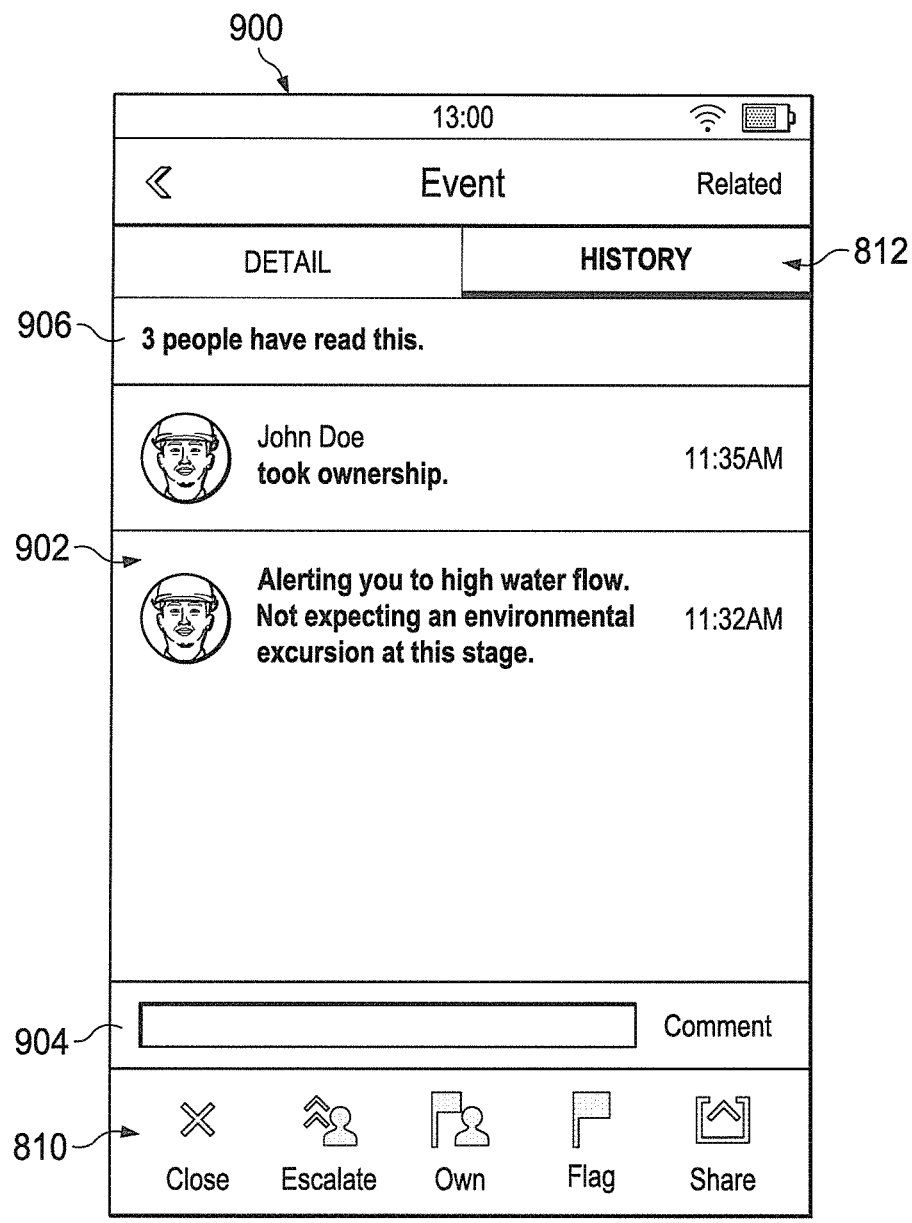

FIGS. 7 through 9 illustrate example notifications related to an industrial process control and automation system according to this disclosure. As shown in FIG. 7, a graphical user interface 700 can be presented by the mobile application 408 on the display screen 506 of an end-user device 150. The graphical user interface 700 here includes a listing of notifications 702. Each notification 702 includes various details about an event, such as a name and severity of the event, a time of the notification, and comments about the event. As shown in this example, the notifications 702 are grouped into different categories, although other categories or arrangements could be used. The graphical user interface 700 also includes various controls 704, such as controls for viewing all notifications, flagged notifications, or closed notifications and controls for changing the viewing arrangement.

Selection of a specific notification 702 in the graphical user interface 700 causes the mobile application 408 to present a graphical user interface 800 as shown in FIG. 8. The graphical user interface 800 includes information 802 identifying a particular event and a trend diagram 804 showing historical values of one or more process variables associated with the particular event. The graphical user interface 800 also includes specific process variable values 806 associated with the event and an identification of the rule(s) 808 that triggered the notification or that are related to the notification. Moreover, the graphical user interface 800 includes controls 810 that allow a user to close a notification, escalate the notification to one or more specific users, own the notification (meaning the user will be responsible for resolving the event), flag the notification (so it appears as a flagged notification in FIG. 7), or share the notification with other users.

In addition, the graphical user interface 800 includes tabs 812 that can be used to select whether detailed information or historical information associated with the selected notification is being presented to the user. In FIG. 8, the "Detail" tab has been selected. Selection of the "History" tab can present content in a graphical user interface 900 as shown in FIG. 9. The graphical user interface 900 here includes the controls 810 and the tabs 812. The graphical user interface 900 also identifies any user comments 902 associated with the selected notification, along with a text entry box 904 that allows entry of a comment related to the selected notification. Any comment entered through the text entry box 904 can be sent from the end-user device 150 to the notification server 144 for delivery to other users who receive the notification.

The graphical user interface 900 further includes a read receipt summary 906, which identifies the number of users who have viewed/read the selected notification. The read receipt summary 906 can represent a link, which could be selected to view a listing of the specific users who have previously viewed/read the selected notification.

The information contained in the graphical user interfaces 800 and 900 provide context for the event associated with the selected notification. Using this information, a user can view details about an event and ideally identify a reason that the event occurred and identify how to resolve the event or interact with other users to resolve the event.

Moreover, the information contained in the graphical user interfaces 600, 800, 900 can be retrieved by the notification server 144 and provided to the end-user device 150 automatically without requiring the user to access different sub-systems within the industrial process control and automation system 100. This can greatly simplify the user's task of identifying causes of and solutions to events in the system 100.

Although FIGS. 7 through 9 illustrate examples of notifications related to an industrial process control and automation system, various changes may be made to FIGS. 7 and 8. For example, the content and arrangement of each graphical interface are for illustration only. Also, while shown as being used with an APPLE IPHONE, the notifications could be used with any other suitable devices.

Figure 10A:
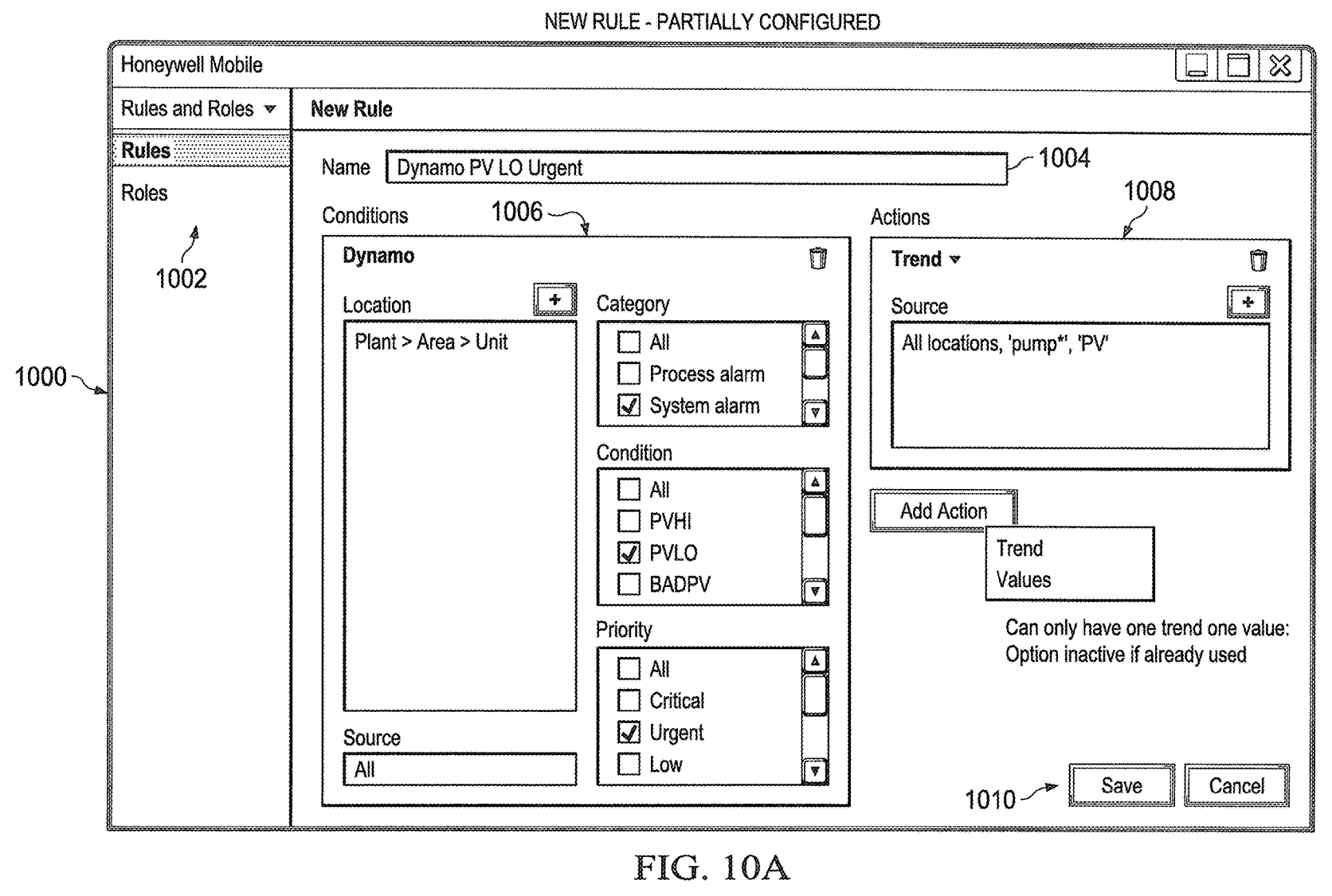

FIGS. 10A through 10C illustrate an example interface 1000 for rule-based definition of notification event context according to this disclosure. In particular, the interface 1000 can be used by various users 304-306 to configure different rules used by the notification server 144 to generate notifications, where the rules include definitions of the contextual information included in the notifications.

As shown in FIG. 10A, the interface 1000 includes a selection area 1002, where a user can choose to define rules for generating notifications or to associate rules with specific user roles. In this case, the user has selected the "Rules" option for defining the rules used to generate the notifications. The user has also started the process of defining a new rule. In this example, the interface 1000 presents a section 1004 for defining the rule's name, a section 1006 for defining one or more conditions associated with the rule, and a section 1008 for defining one or more actions associated with the rule. Note that while shown here as allowing the user to name a rule, the name of the rule could also be automatically generated, such as in accordance with some naming scheme. The sections 1006-1008 can expand when a user elects to add a condition or action.

For each condition, the section 1006 allows a user to identify a location associated with an event, a source of the event, a category of the event, a condition that caused the event, and a priority of the event. Note, however, that the fields shown in the section 1006 of FIG. 10A are what are relevant to the selected data source (DYNAMO in this example), and different elements could appear here for other data sources. For each action, the section 1008 allows a user to identify a source of information for a trend or process value to be provided as additional contextual information. Again, the fields shown in the section 1008 of FIG. 10A are what are relevant based on prior user selections and that other options could be provided for providing other or additional contextual information as part of a notification.

Buttons 1010 allow the user to either save the new rule or cancel. If a trend is defined in the section 1008 as an action, FIG. 10B illustrates input boxes 1011-1012 that could be presented to the user and used to define the trend. The input box 1011 allows the user to search for a source, and the input box 1012 allows the user to define a trend for a selected source.

The rules created using the graphical user interface 1000 can be associated with specific users by selecting the "Roles" option in the selection area 1002. When that occurs, the graphical user interface 1000 can present the contents shown in FIG. 10C, where the "Roles" option expands to include a list 1014 of roles that can be selected by a user. Upon selection of one of the roles in the list 1014, a list 1016 of available rules is presented to the user. The rules in the list 1016 could include all of the rules defined using the mechanism shown in FIG. 10A. The user can use checkboxes in the list 1016 to select which rules are associated with the selected role(s). Buttons 1018 can be used to accept the user's selection of rules for the selected role(s) or to cancel and ignore the current selections.

A user can be associated with one or more roles, and the rules associated with the assigned role(s) are then used by the notification server 144 to generate notifications for that user. This allows each user to be associated with notification rules by associating the user with specific roles rather than specific rules. Of course, other approaches could be used, including those where specific rules are created and then associated with individual users.

Although FIGS. 10A through 10C illustrate one example of an interface 1000 for rule-based definition of notification event context, various changes may be made to FIGS. 10A through 10C. For example, the content and arrangement of the graphical user interface 1000 are for illustration only. Also, while shown as supporting various input mechanisms (such as text boxes, checkboxes, lists, and buttons), any other suitable mechanisms could be used to obtain information from users.

Figure 11:
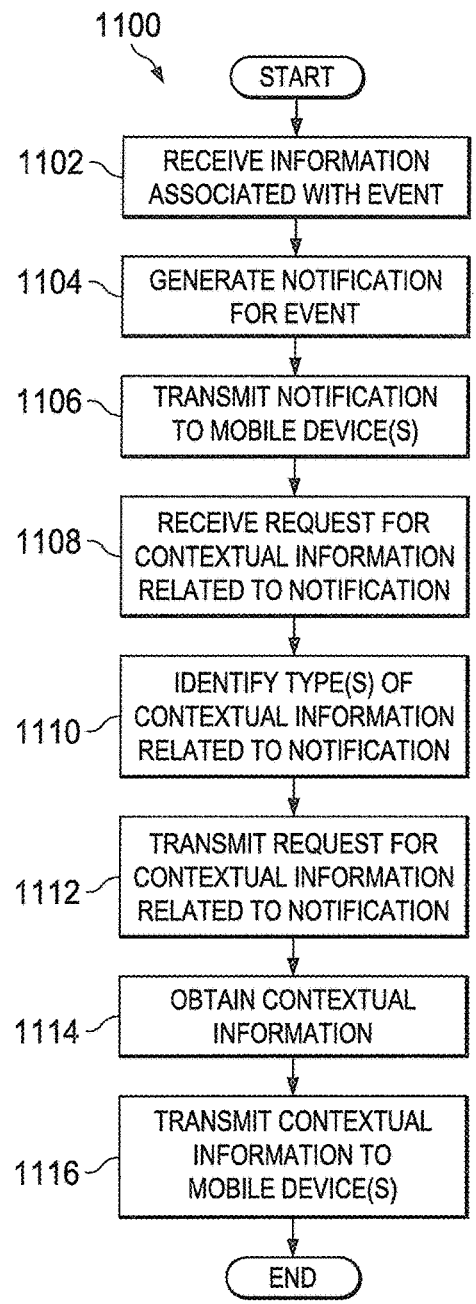
FIGS. 11 and 12 illustrate example methods for providing event context with a notification related to an industrial process control and automation system according to this disclosure.
Figure 12:
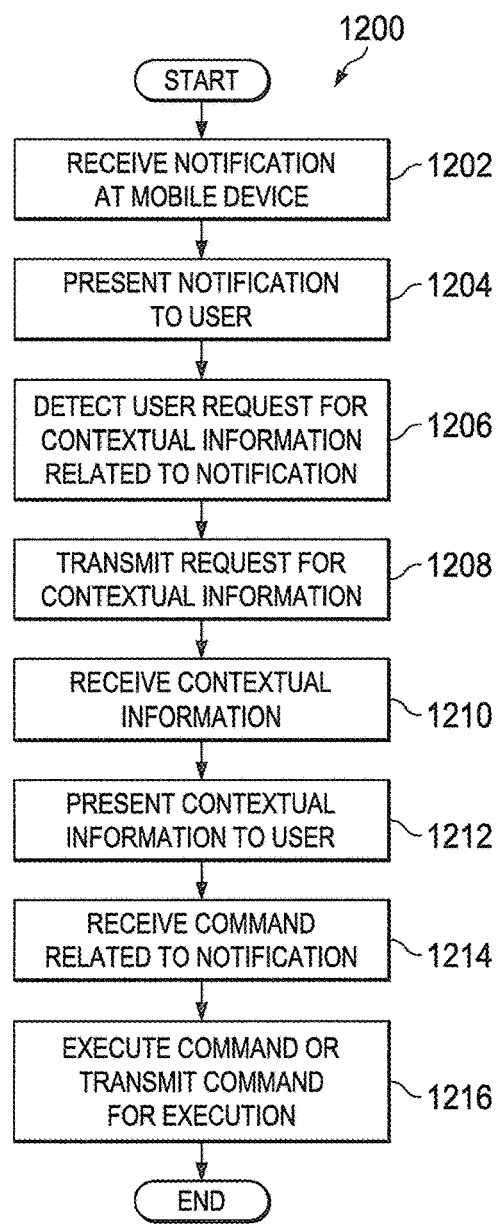

FIGS. 11 and 12 illustrate example methods 1100 and 1200 for providing event context with a notification related to an industrial process control and automation system according to this disclosure. In particular, the method 1100 could be performed by the notification server 144 or other device(s) within an industrial control and automation system, and the method 1200 could be performed by an end-user device 150. However, each method could be performed using any other suitable device or system.

As shown in FIG. 11, information associated with an event is received at step 1102. This could include, for example, the mobile notification unit 404 receiving data from the event detection unit 402, where the data identifies an event that has occurred. A notification associated with the event is generated at step 1104. This could include, for example, the mobile notification unit 404 using one or more rules to identify one or more users to receive a notification associated with the event. Each rule could identify the condition(s) to be met in order to satisfy the rule and the contents of a notification to be generated if the condition(s) is/are satisfied.

The notification is transmitted to one or more mobile devices at step 1106. This could include, for example, the mobile notification unit 404 generating a unique identifier or other obfuscation for the notification and interacting with the third-party notification service 316 to transmit the obfuscation as part of an obfuscated notification to one or more end-user devices 150. This could also include the mobile services unit 406 establishing a VPN or other secure connection with the end-user devices 150 and providing a non-obfuscated notification to the end-user devices 150. Note, however, that the use of obfuscations and obfuscated notifications is not required, and the mobile notification unit 404 or the mobile services unit 406 could provide non-obfuscated notifications to the end-user devices 150 via the third-party notification service 316 or in some other manner.

A request for contextual information related to the notification is received at step 1108. This could include, for example, the mobile services unit 406 receiving an indication that a user of the mobile application 408 at an end-user device 150 has opened the notification. Note, however, that requests for contextual information could have any other suitable form.

One of more types of contextual information related to the notification are identified at step 1110. This could include, for example, the mobile services unit 406 using the rule or other logic that was used to create the notification to identify the type(s) of contextual information related to the notification. One or more requests for the identified contextual information are transmitted at step 1112, and the requested contextual information is obtained at step 1114. This could include, for example, the mobile services unit 406 transmitting requests to the location(s) or source(s) identified in the associated rule and receiving the contextual information from the location(s) or source(s). The contextual information is transmitted to one or more mobile devices at step 1116. This could include, for example, the mobile services unit 406 transmitting the contextual information for display in the graphical user interface 600, 800 of the mobile device.

As shown in FIG. 12, a notification is received at a mobile device at step 1202. This could include, for example, a mobile application 408 on an end-user device 150 receiving an obfuscated notification containing a unique identifier or other obfuscation from the third-party server 148 via the third-party notification service 316. This could also include the end-user device 150 establishing a secure connection to the notification server 144 and transmitting the obfuscation over the secure connection to the notification server 144. This could further include the end-user device 150 receiving a non-obfuscated notification over the secure connection. Note, however, that the use of obfuscations and obfuscated notifications is not required, and the end-user device 150 could receive non-obfuscated notifications via the third-party notification service 316 or in some other manner.

The notification is presented to a user at step 1204. This could include, for example, the mobile application 408 presenting a pop-up message or other message on the screen of the end-user device 150 or including the notification in a list of notifications presented in the graphical user interface 500.

A request for contextual information related to, the notification is received from the user at step 1206. This could include, for example, the mobile application 408 detecting the user selecting a notification, which could function as a request for more detailed information about that notification. Note, however, that other requests for contextual information could also be detected.

A request for contextual information is transmitted at step 1208. This could include, for example, the mobile application 408 transmitting a request to the notification server 144, where the request identifies the notification and requests additional information about the notification. The contextual information is received at step 1210 and presented to the user at step 1212. This could include, for example, the mobile application 408 receiving the contextual information from the notification server 144 and presenting the contextual information in the graphical user interface 800 or other display.

A command related to the notification is received at step 1214, and the command is executed or transmitted to another device or system for execution at step 1216. This could include, for example, the mobile application 408 receiving a request to ignore, escalate, own, flag, or share a notification or submit a comment about the notification. This could also include the mobile application 408 receiving a request to subscribe or unsubscribe to particular information or notifications, collaborate with other users regarding a notification, or raise a work order for dealing with a notification. Any other or additional commands could be supported.

In this way, a user is able to quickly and easily identify the context of a notification, which can help the user resolve a related process control event. Moreover, the context can be provided without requiring the user to remotely access multiple systems and navigate within those systems to identify desired information. Rather, the desired information can be presented on the user's mobile device in response to a selection of a notification.

Note that in these examples, a notification is sent and then contextual information is sent in response to a later request. However, other implementations of the methods 1100 and 1200 could also be used. For example, the contextual information could be requested by the notification server 144 after detection of an event and transmitted from the notification server 144 to the mobile device(s) as part of the original notification. The mobile application 408 could then provide the contextual information to one or more users without requesting the information from the notification server 144.

Although FIGS. 11 and 12 illustrate examples of methods for providing event context with a notification related to an industrial process control and automation system, various changes may be made to FIGS. 11 and 12. For example, while each figure shows a series of steps, various steps in each figure could overlap, occur in parallel, occur in a different order, or occur any number of times. Also, each method could include any number of events and notifications.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   generating a notification using one or more rules to identify one or more users to receive a notification associated with an event,
   transmitting a notification to an end-user device, the notification identifying the event that has been detected in an industrial process control and automation system;
   obtaining contextual information associated with the event, the contextual information comprising one or more types of additional information associated with the event and data that one or more users have looked at before in relation to the event or to similar events;
   identifying one or more types of contextual information using said one or more rules; and
   transmitting the contextual information to the end-user device,
   wherein the end-user device responds to the notification based on one or more factors comprising:
   a predefined priority of the event;
   whether situation is stable, improving, or getting worse;
   whether someone else is already following up on the situation.

2. The method of claim 1, wherein the notification further identifies when the event occurred, where the event occurred, and one or more data values that triggered the event.

3. The method of claim 1, wherein the contextual information comprises at least one of:
   historical data for one or more process variables associated with the event;
   a trend chart of one or more process variables associated with the event;
   a history of the event; and
   a status of related events.

4. The method of claim 1, wherein the contextual information comprises at least one of:
   data that is part of the event itself;
   data explicitly configured as relevant to the event or to a type of the event;
   data associated with the event via a data model.

5. The method of claim 1, wherein the contextual information comprises user comments related to the notification or the event.

6. The method of claim 1, further comprising:
   receiving a request for the contextual information from the end-user device;
   wherein the contextual information is transmitted to the end-user device in response to the request.

7. The method of claim 6, wherein the contextual information is obtained from multiple devices or systems automatically in response to the request.

8. An apparatus configured to:
   generate a notification using one or more rules to identify one or more users to receive a notification associated with an event, said apparatus comprising:
   at least one interface configured to communicate with an end-user device; and
   at least one processing device configured to:
     initiate transmission of a notification to the end-user device, the notification identifying an event that has been detected in an industrial process control and automation system;
     obtain contextual information associated with the event, the contextual information comprising one or more types of additional information associated with the event and data that one or more users have looked at before in relation to the event or to similar events;
     initiate identification one or more types of contextual information using said one or more rules; and
     initiate transmission of the contextual information to the end-user device, wherein the end-user device responds to the notification based on one or more factors comprising:
       a predefined priority of the event;
       whether situation is stable, improving, or getting worse;
       whether someone else is already following up on the situation.

9. The apparatus of claim 8, wherein the notification further identifies when the event occurred, where the event occurred, and one or more data values that triggered the event.

10. The apparatus of claim 8, wherein the contextual information comprises at least one of:
    historical data for one or more process variables associated with the event;
    a trend chart of one or more process variables associated with the event;
    a history of the event; and
    a status of related events.

11. The apparatus of claim 8, wherein the contextual information comprises at least one of:
data that is part of the event itself;
data explicitly configured as relevant to the event or to a type of the event;
data associated with the event via a data model.

12. The apparatus of claim 8, wherein the contextual information comprises user comments related to the notification or the event.

13. The apparatus of claim 8, wherein:
the at least one interface is further configured to receive a request for the contextual information from the end-user device; and
the at least one processing device is configured to initiate the transmission of the contextual information in response to the request.

14. The apparatus of claim 13, wherein the at least one processing device is configured to obtain the contextual information from multiple devices or systems automatically in response to the request.

15. A non-transitory computer readable medium containing computer readable program code that, when executed, causes at least one processing device to:
generate a notification using one or more rules to identify one or more users to receive a notification associated with an event,
initiate transmission of a notification to an end-user device, the notification identifying an event that has been detected in an industrial process control and automation system;
obtain contextual information associated with the event, the contextual information comprising one or more types of additional information associated with the event and data that one or more users have looked at before in relation to the event or to similar events;
initiate identification one or more types of contextual information using said one or more rules; and
initiate transmission of the contextual information to the end-user device,
wherein the end-user device responds to the notification based on one or more factors comprising:
a predefined priority of the event;
whether situation is stable, improving, or getting worse;
whether someone else is already following up on the situation.

16. The non-transitory computer readable medium of claim 15, wherein the contextual information comprises at least one of:
historical data for one or more process variables related to the event;
a trend chart of one or more process variables associated with the event;
a history of the event; and
a status of related events.

17. The non-transitory computer readable medium of claim 15, wherein the contextual information comprises at least one of:
data that is part of the event itself;
data explicitly configured as relevant to the event or to a type of the event;
data associated with the event via a data model.

18. The non-transitory computer readable medium of claim 15, wherein the contextual information comprises user comments related to the notification or the event.

19. The non-transitory computer readable medium of claim 15, wherein:
the non-transitory computer readable medium further contains:
computer readable program code that, when executed, causes the at least one processing device to receive a request for the contextual information from the end-user device; and
the computer readable program code that, when executed, causes the at least one processing device to initiate the transmission of the contextual information comprises:
computer readable program code that, when executed, causes the at least one processing device to initiate the transmission of the contextual information in response to the request.

20. The non-transitory computer readable medium of claim 19, wherein the computer readable program code that, when executed, causes the at least one processing device to obtain the contextual information comprises:
computer readable program code that, when executed, causes the at least one processing device to obtain the contextual information from multiple devices or systems automatically in response to the request.

21. A non-transitory computer readable medium containing computer readable program code that, when executed, causes at least one processing device of a mobile device to:
generate a notification using one or more rules to identify one or more users to receive a notification associated with an event;
receive a notification associated with an event that has been detected in an industrial process control and automation system at the mobile device;
receive contextual information associated with the event at the mobile device, the contextual information comprising one or more types of additional information associated with the event and data that one or more users have looked at before in relation to the event or to similar events;
initiate identification one or more types of contextual information using said one or more rules; and
present the contextual information at the mobile device to a user,
wherein the end-user device responds to the notification based on one or more factors comprising:
a predefined priority of the event;
whether situation is stable, improving, or getting worse;
whether someone else is already following up on the situation.

* * * * *